July 23, 1929.  A. W. WALTEMATH  1,721,579
MILLING MACHINE FOR ENGINE CONNECTING ROD STRAPS
Filed Aug. 25, 1924.  6 Sheets-Sheet 3
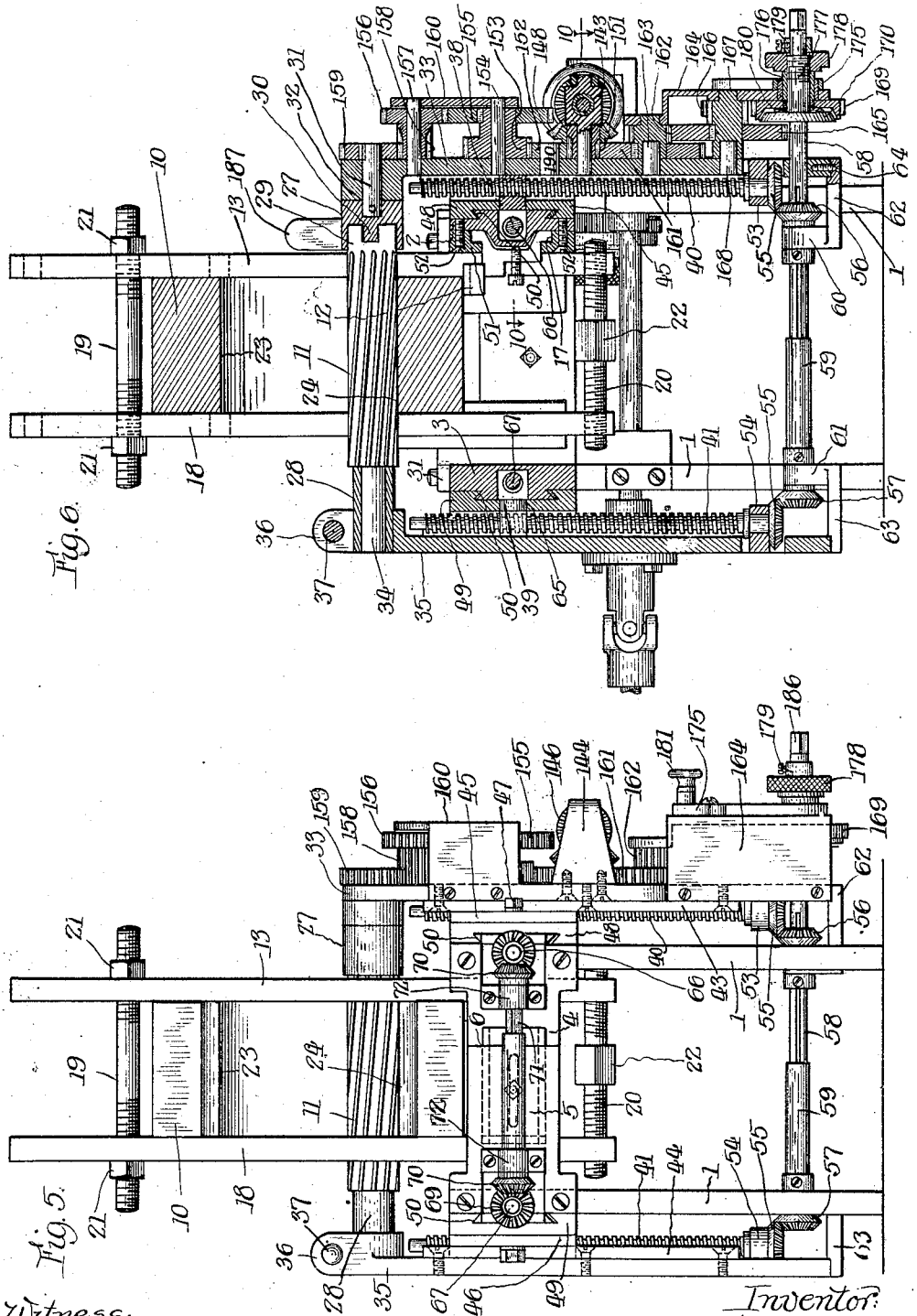

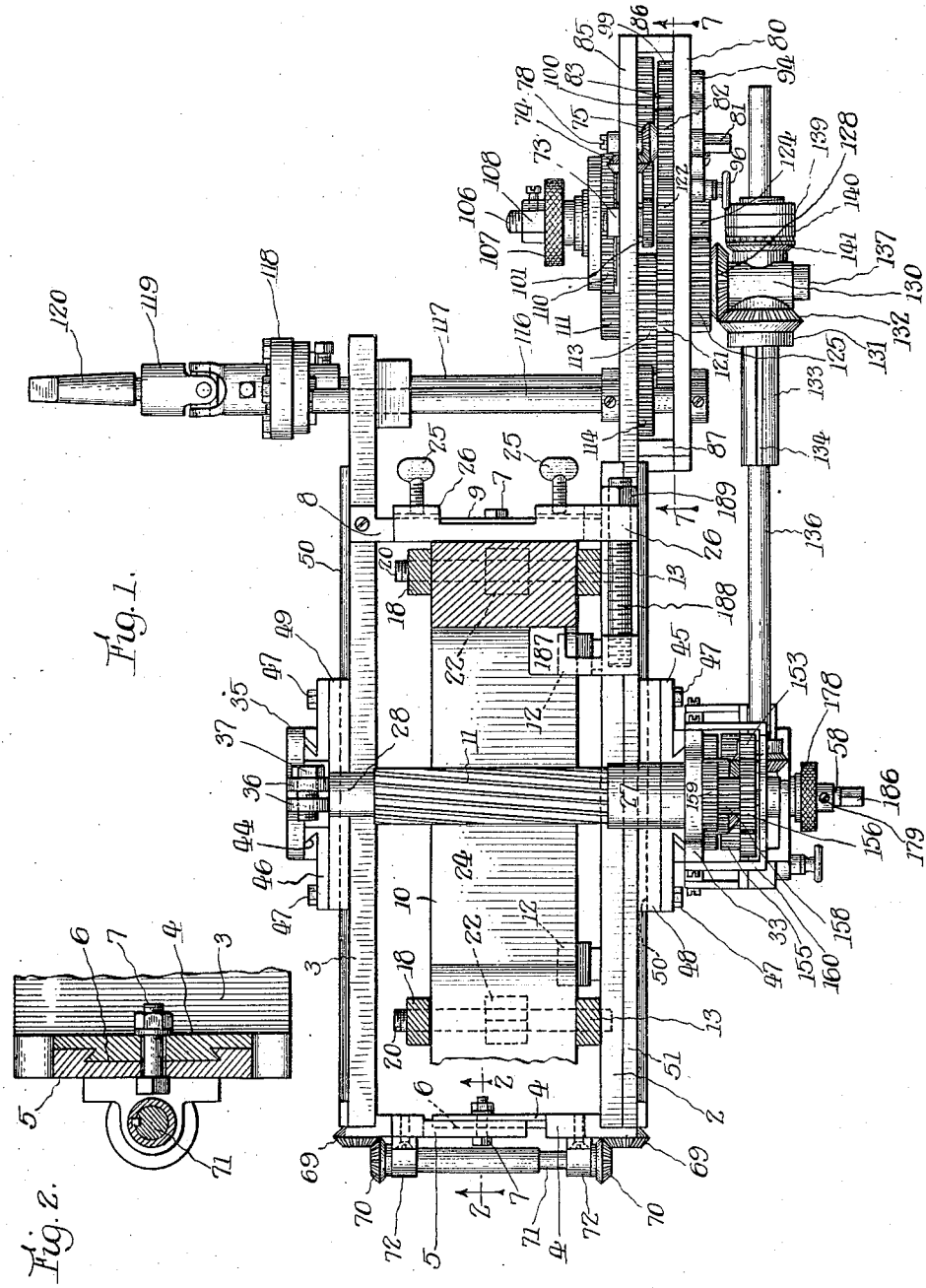

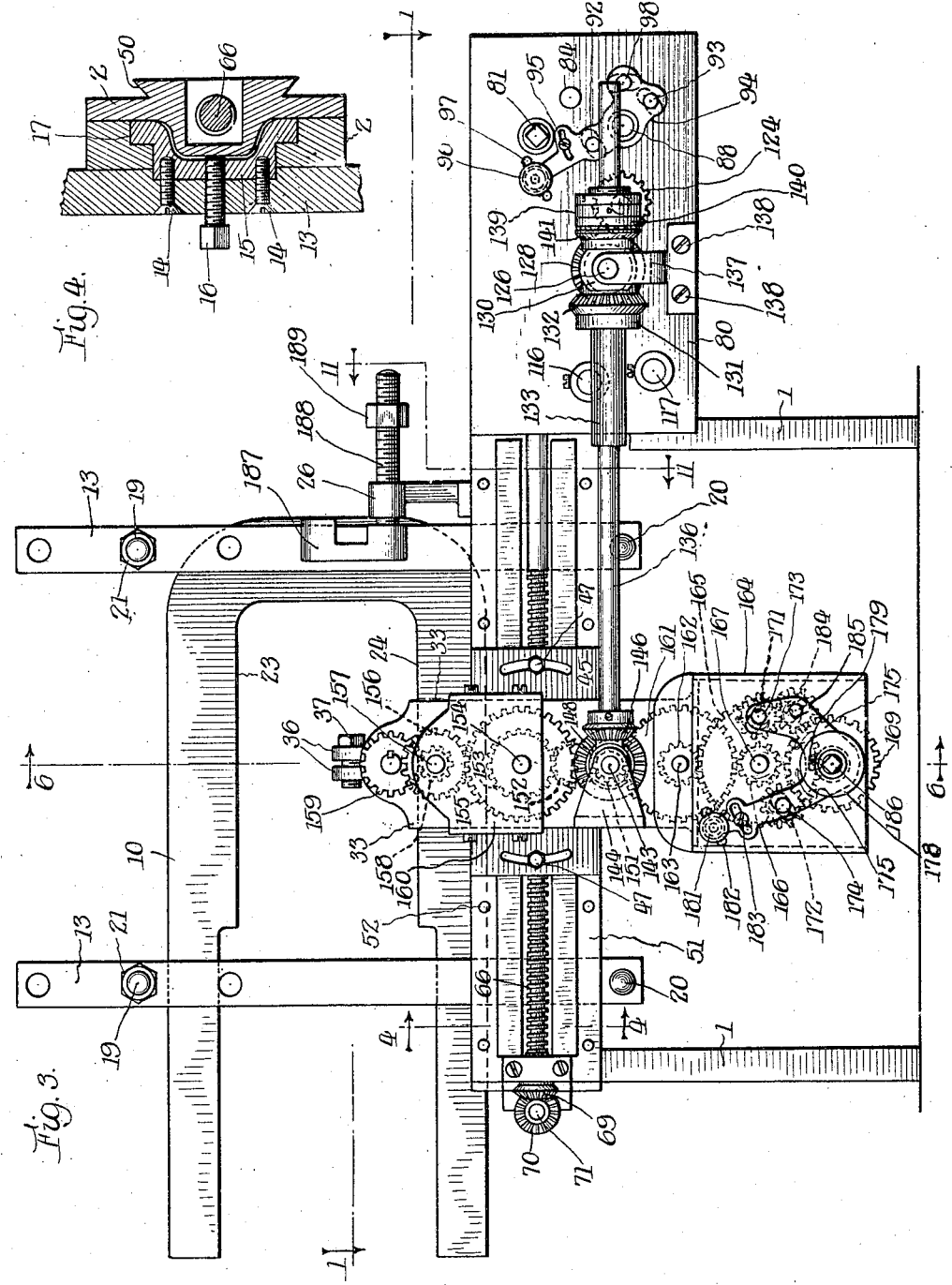

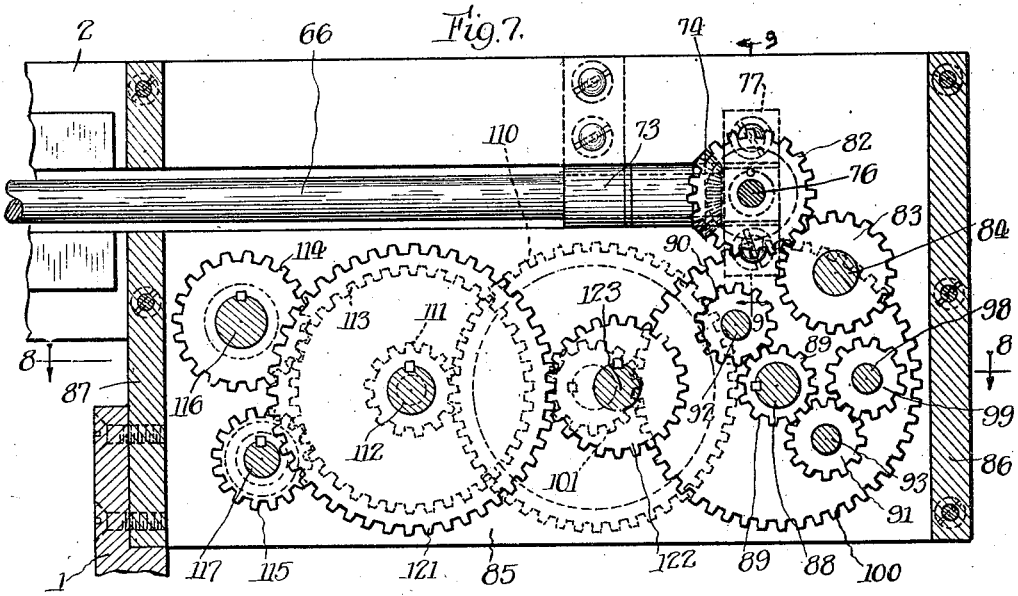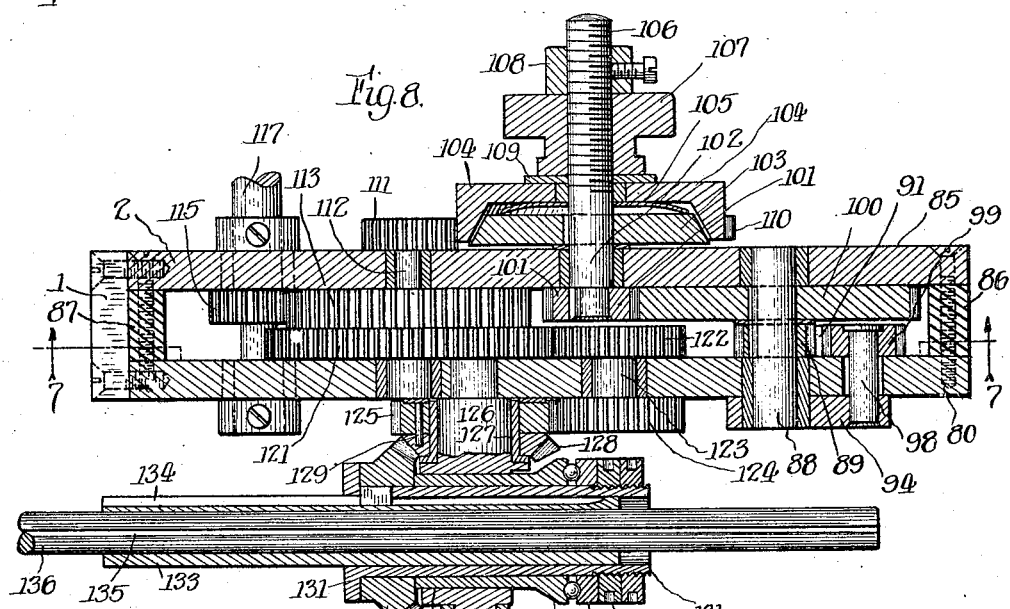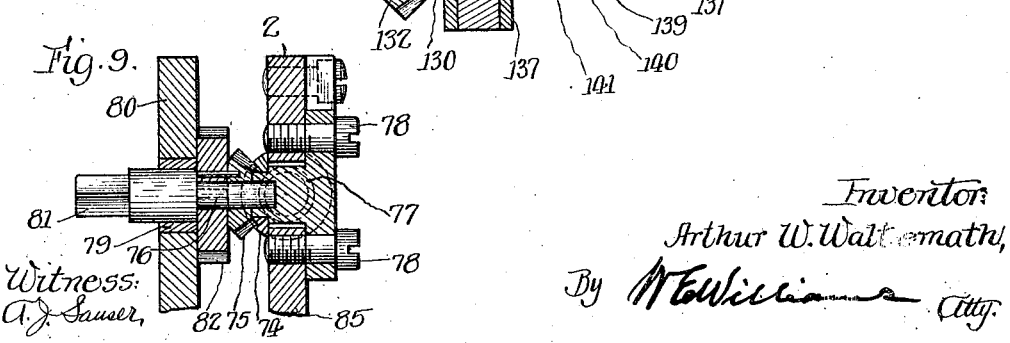

July 23, 1929. A. W. WALTEMATH 1,721,579
MILLING MACHINE FOR ENGINE CONNECTING ROD STRAPS
Filed Aug. 25, 1924   6 Sheets-Sheet 5
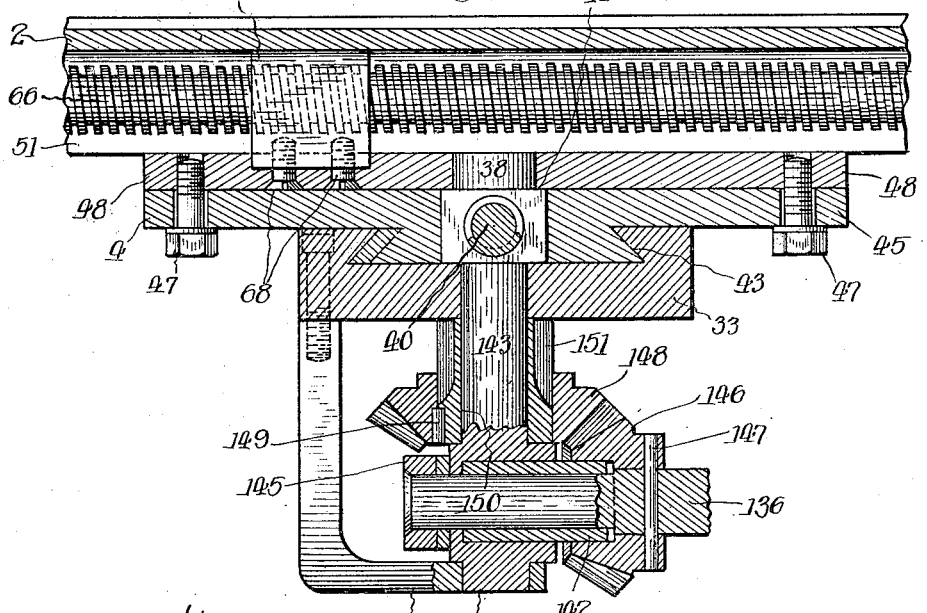
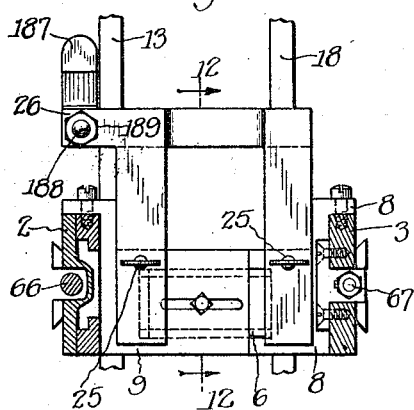
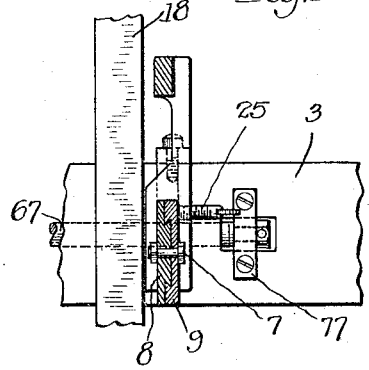
Inventor:
Arthur W. Waltemath,
By W. E. Williams
Atty.
Witness:
A. J. Sauser,

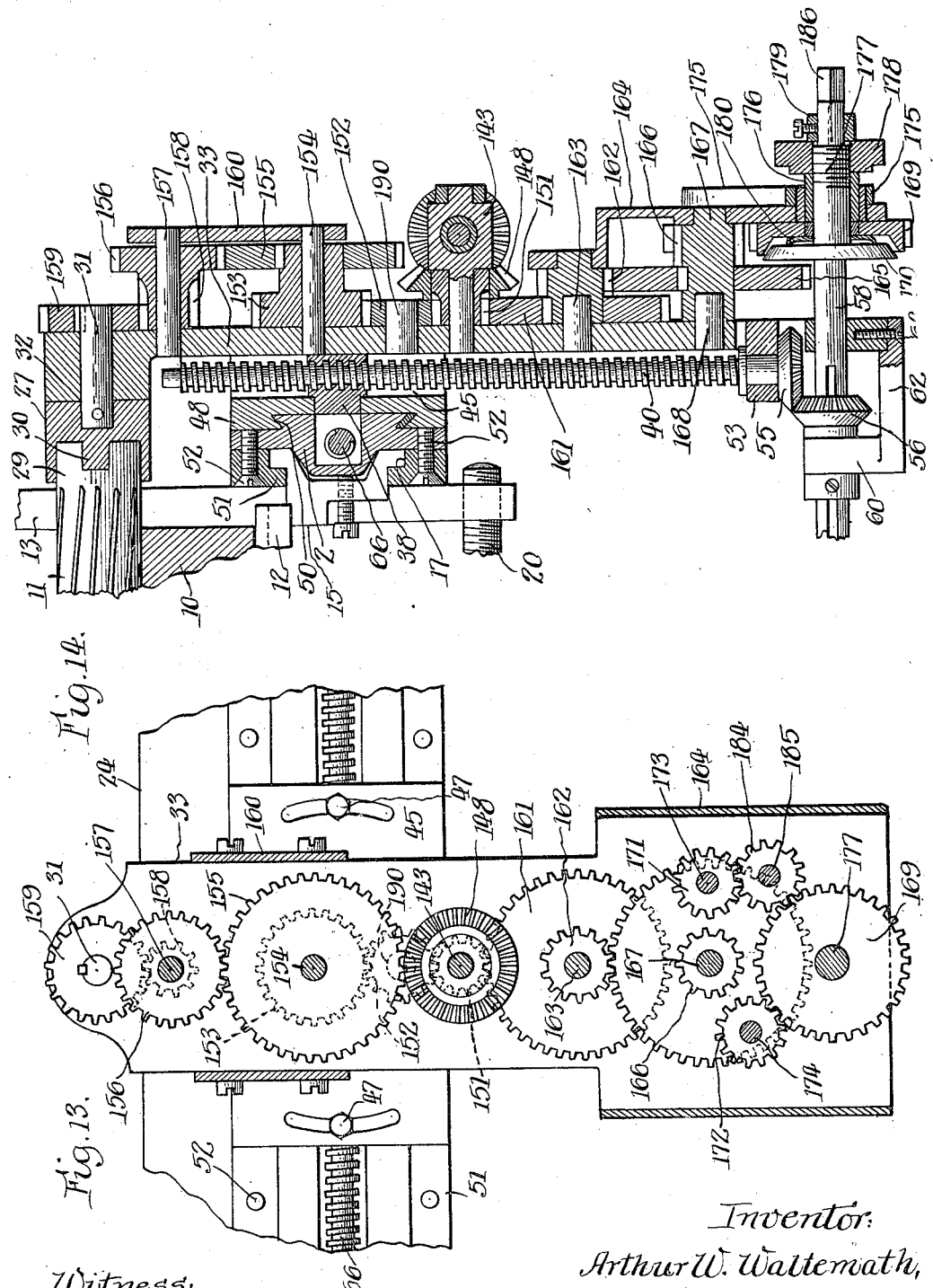

Patented July 23, 1929.

1,721,579

UNITED STATES PATENT OFFICE.

ARTHUR WILLIAM WALTEMATH, OF EAST CHICAGO, INDIANA.

MILLING MACHINE FOR ENGINE CONNECTING-ROD STRAPS.

Application filed August 25, 1924. Serial No. 733,892.

My invention relates to a milling machine which is intended to be used in truing up the fitted surface of connecting rod straps of locomotive engines or other similar surfaces, and the object of the invention is to make a true finished surface in the fitting of engine rod straps or other similar surfaces where accuracy and saving of time of men using files or scrapers for truing the surfaces are needed.

Reference will be had to the accompanying drawings in which Fig. 1 is a plan section of the machine on line 1—1 of Fig. 3.

Fig. 2 is a detail sectional view on line 2—2 of Fig. 1.

Fig. 3 is a side elevation of the machine.

Fig. 4 is a sectional detail on line 4—4 of Fig. 3.

Fig. 5 is an end elevation of the machine looking from the left in Fig. 3.

Fig. 6 is a sectional elevation on line 6—6 of Fig. 3.

Fig. 7 is a sectional elevation of a portion of the right end of the machine on line 7—7 of Fig. 1.

Fig. 8 is a plan section of what is shown in Fig. 7 on line 8—8 of Fig. 7.

Fig. 9 is a vertical transverse section on line 9—9 of Fig. 7.

Fig. 10 is a plan section on line 10—10 of Fig. 6.

Fig. 11 is an end view partly in section of a portion of the right end of the machine as shown in Fig. 3 on line 11—11 of Fig. 3.

Fig. 12 is a transverse sectional view of what is shown in Fig. 11 on line 12—12 of Fig. 11.

Fig. 13 is an enlarged detail, partly in section, of the trains of gearing shown in dotted lines in Fig. 3.

Fig. 14 is an enlarged detail of the right hand portion of Fig. 6.

In the manufacture and repair of engines such as locomotives and other engines, wherein connecting rods are used of the type commonly used with steam engines, particularly of the locomotive type, it has heretofore been necessary to do a lot of hand filing, scraping and fitting of the ends of the rods or the strap portion of the connecting rods wherein are held the bearing brasses or bushings.

The connecting rod straps and the brasses of locomotive engines wear and pound unevenly across the portion of the strap in which the bearing brasses are held.

The amount of wear is relatively slight and it is not desirable to take a heavy cut for truing purposes as that weakens the strap and also makes necessary larger variations in the replacement of the brasses than is the case where the straps have been trued up by hand work.

My invention provides a light portable milling machine splendidly adapted to taking light true finishing cuts on the surfaces to be fitted for the brasses and other engine connecting rods. The outer or vertical faces of the connecting rod ends and connecting rod straps are easily machined true and parallel as relates to the two vertical faces, and little or no wear takes place on these outside vertical faces in the service of the connecting rod.

Thus, in the manufacture of rods in the first instance and in repairing the rods after wear, the two outside vertical faces are used, for they are machined as the faces to which the inner and transverse surfaces are made to conform in proper relationship in order to hold the brasses or bearings in proper position in the connecting rod ends.

I provide in my machine special holding apparatus into which a connecting rod end or a connecting rod strap may be quickly mounted and then with my milling cutter quickly trimmed or fitted to the right true surfaces required to hold the brasses or bearing bushings.

In the drawing, 1 indicates the legs of the framework of the machine which may be any suitable supporting devices. They are connected to the longitudinal side frame pieces 2 and 3, 2 being the side piece shown at the front in Fig. 1, and 3 being in the rear thereof.

These side frame pieces are connected across at their ends by cross frame members which permit an adjustment as to the distance between the side frame members 2 and 3 and these end members are indicated at the left of the machine as 4 and 5 see Figs. 1 and 2. These two members are held in alignment by means of dove tail sliding surfaces 6 and are fixed at any adjustment by means of the bolt 7. At the right hand end of the machine a similar adjustable construction is provided for the cross frame piece indicated by 8 and 9. The purpose being that the machine may be somewhat wider or narrower to fit any given class of work for which there is the greater use.

It is desirable always to have the machine as narrow as possible in order that the span of the milling cutter may be as short as possible, since the cutter used is relatively a small one and thus has a relatively low bending moment.

The work to be acted upon is indicated by 10, here shown as a detached strap from the end of a connecting rod, see Fig. 3.

However, the full end of a connecting rod may be substituted for a strap when desired, the only additional feature necessary being that the outer end of the rod be supported against undue strain of tipping the machine or displacing its adjustment by reason of the weight of the overhang of the end of the heavy connecting rod.

The milling cutter acting on the surface to be finished is indicated by 11 and the mechanism for driving and moving this cutter for the various different positions and fits required is supported in the frame members already described.

The method and mechanism of mounting, registering and holding the connecting rod strap 10, to be operated upon by the milling cutter 11, is composed primarily of registering blocks 12 located on the frame piece 2 at the front of the machine as shown in Fig. 1 and at the right side of the machine as shown in Fig. 6. These blocks are on one side only of the frame and are adjustable longitudinally of the frame piece through the medium of a guideway 17 in the frame, see Fig. 4.

On the inside of the frame pieces 2 there are vertical clamping bars accurately finished as to size indicated by 13 which are secured by bolts 14 which are secured to another set of blocks 15 held in the guideway 17 in the frame piece 2 and these blocks 15 are held in any desired position along the frame piece 2 by means of set screws 16.

A secondary set of clamping bars 18 are connected across to the bars 13 by the clamping bolts 19 and 20. The bolts 19 are threaded on each end for the regular right hand threads upon which there are the nuts 21.

The bolts 20 are provided at their ends with right and left hand threads which are screwed into their respective bars and are provided with a square surface 22 for engagement with a wrench for the adjustment of the bars 18 by turning the bolts 20 whereas with the bolts 19, the nuts 21 must be screwed in making the clamping adjustment.

In the use of the machine the connecting rod strap is placed upon the blocks 12 as a base registration and then the bars 13 are clamped by the bolts 19 and 20 onto the strap 10 bringing the strap over against the bars 13, thus registering the strap exactly at right angles with the bars 13 as relates to the surfaces 23 and 24, see Fig. 6, that are to be milled by the milling cutter 11 as indicated in the drawings.

The end thrust and the end adjustment of the strap against the thrust of the milling cutter is taken up by stud screws 25 passing thru the right end cross member pieces of the frame as indicated by 8 and 9.

When the milling cutter is used as it were on a backward feed or a feed to the left which may sometimes be desired especially as relates to the upper surfaces of the inside of the strap, I then desire to clamp the strap in a reverse direction from that shown by the screws 25 and for this purpose I provide a block 187 shown in clamping position in Fig. 1 and in an idle turned up position in Fig. 3. This block 187 is fixed into the end of a bolt 188 passing through keeper block 26 and when the block 187 is to be clamped to the work the nut 189 is set up against the keeper block 26 which block is fastened to and becomes a part of the cross frame piece 9.

When the block 187 is not used for clamping purposes it is turned up in an idle position as previously mentioned as shown in Figs. 3 and 6.

Thus by the means of mounting the connecting rod strap 10 onto the machine as just above described the blocks 12 and bars 13 and 18 may be adjusted for different lengths of straps as desired, and may be adjusted for different widths of straps to suit any special requirements of different sizes of widths of straps that are the major portion of the work desired to be done, thus making an efficient machine for this special class of work.

The milling cutter 11 is mounted in suitable bearings 27 and 28 in a manner that the cutter itself may be readily removed and another one inserted for any cause, either for a renewal of the diameter or the length or for a sharper or better cutter.

To accomplish this readily the bearing 27 is substantially a socket into which the head 29 of the milling cutter is inserted and prevented from rotation by a cross slot in the milling cutter fitting over a cross rib 30 of the socket 27. The socket 27 is supported on a journal pin 31 carried in a journal box 32 of a vertical frame casting 33. In this frame casting 33 there are the stud pins which support the series of gears which drive the socket 27 and the milling cutter 11 in doing its work.

The other socket or bearing 28 which carries the spindle 34 of the milling cutter is simply a bushing which is clamped into the casting 35 by means of two clamping lugs 36 adjusted to clamp by the bolt 37. Thus in removing the milling cutter, the bolt 37 is loosened releasing the clamping lugs 36 from the contact with the bushing 28 which permits the bushing 28 to be withdrawn entirely endwise off from the spindle portion 34 of the milling cutter, and thus the milling cutter may be withdrawn from the socket 27 and another one inserted.

It is a common practice in milling machines of the universal type to support the milling cutter from one end only, but with a relatively small milling cutter as relates to its length and for accurate close work as desired in a machine of this class, it is necessary to provide a mounting for the cutter at each end and at the same time furnish facilities which permit a ready removal and adjustment for the milling cutter in its work. This is also made necessary with some classes of straps or rod ends which are solid and the milling cutter must be introduced endwise through the aperture in order to get into position for the work required.

The vertical castings 33 and 35 are adjustable vertically and they may also be adjusted in a swinging or radial motion about a central axis which passes through the center line of a hinge pin block at each side of the frame, see Figs. 6 and 10, wherein the pin block at the right of the machine is indicated by 38 and to the left of the machine by 39. These blocks also act as the nuts for the vertical screws 40 and 41 which hold and adjust in position the said vertical castings 33 and 35.

The hinge pin blocks 38 and 39 have shoulders 42 which prevent them moving in toward the center of the machine, and they cannot move outward because of the castings 33 and 35.

The said castings 33 and 35 are secured by guideways 43 and 44 to blocks 45 and 46. The said blocks 45 and 46 are mounted on the said hinge pins 38 and 39 and secured in fixed position of rotation as desired by the axis of the hinge pins 38 and 39 by clamping bolts 47, see Figs. 1, 3 and 10.

These bolts 47 and hinge pin blocks 38 and 39 are secured onto blocks 48 and 49 mounted in guideways 50 in the longitudinal frame pieces. At the left of the machine and the far side of the view as shown in Fig. 1, the longitudinal frame piece 3 is one piece, but at the right the right longitudinal frame piece 2 is provided with a secondary frame piece 51 secured by screws 52, see Fig. 3.

The purpose of making this right frame piece in the pieces 2 and 51 is to provide the guideways and the entry of the registering blocks 12 and 15 as previously shown and described.

The screws 40 and 41 are secured onto their respective castings by the keeper blocks 53 and 54, and thus as the screws 40 and 41 move up and downward they carry simultaneously the castings 33 and 35.

The two screws 40 and 41 are driven by bevel gears 55 which are engaged by gears 56 and 57 which are driven from a shaft 58, which shaft 58 has a telescoping portion 59 to accommodate the adjustment of the machine in relation to the width apart of the side frame pieces to accommodate different lengths of cutter and different widths of strap as above described. This telescoping shaft 58 is carried in bearings 60 and 61 connected by the portions 62 and 63 by screws 64 at their respective frame castings 33 and 35. This arrangement of the connections and supporting members for the castings or frame pieces 33 and 35 causes them to be adjusted vertically and rotatively in the right positions as to each other.

The blocks 48 and 49 are the connecting or supporting means for carrying the castings 33 and 35 on the frame, and these blocks 48 and 49 are provided with small blocks 65 which are substantially the same on each side of the machine, but best shown in Fig. 10 for the right side of the machine, and they act as nuts for the longitudinal screws 66 and 67. The said blocks 65 are secured by flat head screws 68 to the said blocks 48 and 49.

Thus the longitudinal screws 66 and 67 determine the positions of the blocks 48 and 49 longitudinally of the machine and these screws 66 and 67 are connected to move together by bevel gears 69 which are engaged by gears 70 mounted on a telescoping shaft 71 carried in bearings 72 in the left end frame of the machine. The screw 66 being driven from its right end thus becomes as it were the live driving member of this system of adjusting the feed.

The vertical frame castings 33 and 35 and their supporting guideway blocks 45 and 46 and guideway blocks 48 and 49 as described which connect and support them to the frame, compose as it were a carriage for carrying the milling cutter in its work.

The screw shaft 66 extends to the right of the machine and passes along the frame extension at the right end as is indicated in Figs. 3 and 7. This right end portion of the shaft 66 is not threaded as threads are unnecessary for this portion of the shaft. The end of this screw shaft 66 is supported in a bearing block 73, and on the outer end of it there is mounted a bevel gear 74 which bevel gear is shown in the plan view, Fig. 1, and in the detail view Fig. 9.

A bevel gear 75 engages this bevel gear 74 and drives the same either by hand power or power feed as desired from the arrangement of the gearing connected to the bevel gear 75.

The bevel gear 75 is mounted upon the shaft 76 one end of which is supported in a block 77 secured to the frame by screws 78.

The other end of this shaft 76 is carried in a bushing 79, see Fig. 9, in the portion of the frame piece indicated by 80. The outer end 81 of this shaft 76 is square for the application of a hand wrench for the hand feeding of the screw shaft.

Mounted along side the bevel gear 75 on the shaft 76 there is a spur gear 82 which is engaged and driven as desired by a spur gear 83 on a stud 84 in the two right end frame pieces indicated by 80 and 85. These end pieces are spaced apart by filler blocks 86 and 87 and the two frame pieces 80 and 85 so spaced apart furnish the bearing supports for the trains of gears which are used to connect with the source of power which drives the machine.

The screws 66 and 67 are the horizontal feeding device for feeding the milling cutter to its work and are necessarily operated by hand at times as may be done by the application of the wrench to the end 81 of the shaft 76 and also power driven so that the mechanism is provided for engaging and disengaging the power to drive the said screws 66 and 67 and for reversing their direction. This mechanism is provided in the form of a shaft 88 which normally is moving all the time under the influence of the power of the machine as described or it may be disconnected from the power by clutch mechanism which I will describe.

Upon the shaft 88 there is mounted a pinion 89 which engages on one side a pinion 90 and on the other side a pinion 91, the pinion 90 being carried upon a stud 92, and the pinion 91 upon a stud 93, and these two studs 92 and 93 are mounted on an arm 94 mounted on the said shaft 88 in a manner to swing for a short distance about this shaft 88 as a center and this arm 94 is clamped in any given position by a clamping screw 95.

There is also a spring locking pin indicated by 96 on the upper end of this lever or arm 94 which is adapted to be engaged in pin holes 97 in the front frame piece 80. Thus by loosening the screw 95 and by the proper handling of the locking pin 96 the pinions 90 and 91 may be rotated about the pinion 89 in a manner to bring the pinion 90 into engagement with the gear wheel 83 or in a neutral position as shown in Fig. 7.

Upon the said arm 94 there is a stud 98 which carries a pinion 99 always in mesh with the pinion 91 and thus when the locking pin 96 is set over to the left to its limit, the pinion 99 engages the gear 83 and thus drives the gear 83 from the pinion 89 in a reverse direction from that which takes place when the pinion 90 is in gear with the gear 83.

The shaft 88 which carries and drives the pinion 89 has mounted thereon a driving gear 100 which is driven from the pinion 101, and the pinion 101 is mounted upon a shaft 102 and is driven by a friction clutch block 103 from a cone clutch member 104 which member is held in released position by a spring 105.

The shaft 102 is screw threaded on its outer end 106 upon which there is threaded a hand hold nut 107 limited in its outward movement by a collar 108, see Fig. 8, and provided with a friction washer 109. Thus by the nut 107 the friction clutch may be engaged to drive the shaft 102 and thus the pinion 101 from the outside cone clutch member 104 which has upon its outer margin the spur gear teeth 110 and these are engaged by the gear 111 upon the shaft 112.

Mounted upon the shaft 112 there is a gear 113, see Figs. 7 and 8, which is driven as desired by either one of the two gears 114 or 115 upon shafts 116 and 117 respectively.

The shaft 117 as indicated in Fig. 1, is here shown as the live driving shaft connected through the flange connection 118, see Fig. 1, to a universal joint 119 provided with a socket 120, which socket 120 is adapted to be connected to any suitable source of power either fixed or portable. The purpose of using this socket 120 as shown is that locomotive shops are provided with air driven tools adapted to connect to sockets of this kind so that this machine being light and portable may be moved to the position of the locomotive whose straps are to be refinished and the machine connected up to be driven by the air tool connections which are already provided at the several different locations where the machines are to be used.

The shaft 116 is really a duplicate of the shaft 117 the difference being that the gear 114 is larger than the gear 115 and thus by changing the flange connection 118 from the shaft 117 to the shaft 116 a variation in the driving speed may be provided.

Mounted on the shaft 112 along side the gear 113 there is a gear 121, see Figs. 7 and 8, which revolves with the shaft 112 and meshes in and drives the gear 122 mounted on a short shaft or stud 123, and this shaft 123 is provided with a gear 124 on the outside of the frame of the same size as the gear 122. This gear 124 meshes and drives a gear 125 upon a shaft 126 which is a rocking shaft or block supported into the front frame member 80 and upon which there is the bushing 127 upon which the gear 125 revolves.

Mounted also upon this bushing 127 there is a bevel gear 128 which is connected to the gear 125 by one or more pins 129. The bushing 127 is provided with a lip on its edge which holds the bevel gear 128 in close contact with the gear 125 and this bushing is held in place by a shoulder on the rocking shaft block 126.

The shaft block 126 is rather large and is provided with the bearing 130 which is adapted to carry a fixed bushing 141, in which there revolves the rotating sleeve 131 upon which is mounted a bevel gear 132. Thus the bevel gear 132 is driven from a source of power as I have just traced. It in turn drives the rotating sleeve 131 as it is keyed to the said sleeve.

On the inside of the said sleeve 131 there is a secondary sleeve 133 which is splined as indicated by 134 to the sleeve 131 and also as indicated by 135 to a shaft 136, so that the shaft 136 is driven in any position of its adjustment along the spline connection of the sleeve 133 and it in turn along its spline connection of the sleeve 131.

The purpose of these two sleeves is to permit a sort of a telescoping connection greater than might be accomplished with the sleeve 131 if it alone were used. In other words by using the two sleeves less space may be needed in the length of the machine than might be desirable if only one sleeve were used.

The shaft block 126 is supported at its outer end by a supporting bracket 137, see Figs. 1, 3 and 8, secured by screws 138 to the frame piece 80.

The sleeve 131 at its right end is threaded for screw collars 139 which are adjusted up against a ball bearing thrust collar 140 which abuts against the end of the fixed bushing 141 which abuts against the gear 132, previously mentioned, and thus the thrust of the gear 132 is taken up by the balls between the collar 140 and the fixed bushing 141.

The shaft 136 is the medium of furnishing the power that operates the milling cutter and also the vertical or inclined feed of the milling cutter.

The arrangement of the gearing as described mounted on the shaft block 126 is such that the shaft 136 may rotate the said shaft block 126 sufficiently to accommodate vertical movement of the milling cutter and its housings and gears.

The left end of the shaft 136, see Figs. 3 and 10, is journaled in a bushing 142 carried in a shaft block 143 one end of which is mounted in the casting 33 and the other end supported by a bracket 144 extending from the casting 33.

The shaft 143 may revolve sufficiently to accommodate the angularity of the shaft 136 when the casting 33 moves in vertical movement.

The shaft 136 is secured in the block 143 and the bushing 142 by a collar 145. Upon the shaft 136 there is the bevel pinion 146 secured by a pin 147 against rotation and this bevel pinion 146 engages the bevel pinion 148 which is fixed by a pin 149 to the end 150 of a spur pinion 151 and thus the shaft 136 drives the spur pinion 151.

The spur pinion 151 engages on the lower side a spur pinion 152 mounted on a stud 190 and engages a gear 153 mounted on a stud 154. Upon the hub of this spur gear 153 there is a spur gear 155 and this gear 155 engages a gear 156 mounted on a stud 157 and upon the hub of this gear 156 there is a pinion 158 which engages a gear 159 on the journal pin 31 which drives the milling cutter 11 as previously described.

The studs 154 and 157 are supported at one of their inner ends in the casting 30 and at the outer ends by a connecting bracket 160. Thus the milling cutter may be driven in any direction of feed to the work in any position of its adjustment in any direction because of the mounting of the shafts and gearing as described.

The vertical movement of the castings 33 and 35 which support the milling cutter is brought about by the screws 40 and 41 as previously described, being driven by the shaft 58 through the bevel gearing 56, 57, and 55 as previously mentioned, and the shaft 58 is driven through the medium of the shaft 136 by the pinion 151, previously mentioned, engaging the gear 161 mounted upon the hub of a pinion 162.

The pinion 162 is mounted on a stud 163 fixed into the casting 33 and the pinion 162 is provided with a trunnion adapted to be journaled on a block piece 164. This pinion 162 engages a gear 165 mounted on the hub of a pinion 166 and thus adapted to drive the pinion 166. This pinion is supported at the right by a trunnion 167 in the aforementioned bracket piece 164 and the other end of this pinion 166 is mounted to revolve on a stud pin 168 fixed in the casting 33.

The pinion 166 is engaged to alternately drive some pinions 171 and 172 as desired. the latter pinions 171 and 172 are mounted on studs 173 and 174, see Fig. 3, held by an adjustable arm 175, which arm 175 is mounted on a bushing 176 on the aforementioned shaft 58.

The said shaft 58 is provided with a threaded portion 177 upon which there is screwed the hand nut 178 limited in its movement by a stud collar 179.

By means of this nut 178 a cone friction clutch gear 169 may be engaged to a cone block 170, a similar construction to the clutch device shown in Fig. 8, a flat spring 180 releasing the clutch when desired.

The arm 175 is controlled in its position of rotation about the shaft 58, in relation to bringing into mesh and throwing out of mesh the pinions 171 and 172 with the gear 166, by a locking pin 181, see Fig. 3, adapted to engage holes 182 in the bracket piece 164. When the arm is located in any desired position it is secured by the clamping screw 183 which passes through a slotted aperture in the arm and adapted to clamp the arm in a fixed position.

The cone block 170 is engaged by the friction clutch gear 169, and the pinion 171 is constantly in mesh with the pinion 184 on a stud 185 in the said arm 175, and the pinion 184 is also constantly in mesh with the pinion or clutch gear 169.

Thus by shifting the mesh of the pinions 171 and 172 with the gear 166 the direction of movement of the gear 169 may be changed or a neutral position arrived at. The neutral position is shown in Fig. 3.

By this arrangement the vertical screws 40 and 41 are made to be driven by power and thus producing a power feed for the milling cutter in vertical or angular relationship. When these adjustments are desired to be made by hand a wrench is applied to the square end 186 of the shaft 58.

Some of the surfaces in a connecting rod strap are angular or inclined to accommodate what might be termed a wedged end connection of the brasses and this wedged end surface may be finished with the cutter on any desired feed line of travel by the construction as shown and described.

What I claim is:

1. In a machine of the class described, an adjustable supporting frame, a carriage adapted to hold and carry and operate a milling cutter mounted on the said frame, said frame provided on each side with guideways adapted to carry the carriage members of the carriage frame and said carriage frame having sections on each side of the frame, bearings for mounting the milling cutter transversely of the frame and supporting the same at each end of the milling cutter, mechanism for moving the milling cutter bodily in vertical, circular and in horizontal directions in relation to the piece to be operated upon, and said mechanism connected across from one side of the framework to the other and adjustable with the frame as to the width of the frame.

2. In a machine of the class described, the combination with a frame having a plurality of side members each provided with a guideway, a plurality of guideway blocks mounted in said guideways and adapted to travel lengthwise of said frame, a plurality of supporting guide blocks mounted on said guideway blocks and adapted for rotatable adjustment, a plurality of vertical carriage frame castings mounted on said guideway blocks, a plurality of milling cutter bearings carried by said frame castings, a milling cutter mounted in said bearings, screw operated feeding means for said guideway blocks adapted to feed said blocks longitudinally of said frame, a secondary screw operated feed mechanism adapted to feed the vertical carriage frame castings with respect to said supporting blocks, and a system of gearing adapted to operate the milling cutter in any position and also to operate said screw operated feeding mechanism.

3. In a machine of the class described, a framework having rectangularly arranged frame pieces, of which the side frame pieces have guideways adapted to carry guideway blocks and the latter adapted to support carriage members for a milling cutter, there being a carriage member on each side frame piece, and means for feeding these carriage members longitudinally along the side frame members, one of the said side frame members being provided with an additional guideway in which is mounted registering blocks and clamping bars for holding the piece to be operated on by the milling cutter, the registering blocks being independent of the clamping bars, and adapted to furnish a bearing for the piece on one edge only, and the said clamping bars vertically arranged in relation to the frame and at right angles to the axis of the milling cutter supported in said carriage members and the said clamping bars provided with movable secondary clamping bars adapted to clamp the piece transversely of the surfaces to be operated upon.

4. In a machine of the class described, the combination with a frame member having a vertical face, two spaced longitudinal guideways and an inside longitudinal guideway, of a plurality of guideway blocks mounted on said first set of guideways, a carriage mechanism carried by said guideway blocks, a milling cutter supported by said carriage mechanism, and work registering and clamping means mounted on said inside guideway.

5. In a portable milling machine for trimming re-entrant faces of connecting rod straps, the combination with a supporting frame having two side frame members, of means for clamping a connecting rod strap by moving one of said side frame members in the direction of the companion member, a supporting block mounted on a horizontal guideway of each side frame member, a hinge pin block carried by said supporting block and having internal screw threads, a frame piece having a vertical screw engaging the threads of said hinge pin block, a milling cutter removably mounted in bearings carried by said side frame pieces, and means for rotating said milling cutter and for feeding it along the internal faces of a connecting rod strap by suitable horizontal and vertical movements.

6. In a machine of the class described, a movable carriage, a frame rectangular in outline, carrying on each side a portion of a movable carriage, and a screw feed mechanism for moving the carriage portion composed of a screw member on each side of the frame, and the two screw members connected across to be driven in unison; in combination with a secondary carriage composed of two portions one in each portion of the first mentioned carriage, and screw feeding means for each portion of the secondary carriage and these screw feeding means connected across to be driven in unison, in combination with suitable gearing connected to any suitable source of power for driving the said feeding mechanism.

7. In a machine of the class described, registering and clamping means for clamping a connecting rod strap to the frame of the machine, a carriage adapted to carry a milling cutter and move the said cutter along the re-entrant faces of the strap to be operated upon, said carriage adapted to be moved horizontally and vertically in relation to the frame and the strap clamped thereon, a system of gearing mounted in the carriage for driving the milling cutter and for feeding the cutter in vertical arrangement to the frame and a secondary system of gearing mounted on one end of the frame and connected to a suitable source of power and the said secondary system of gearing connected to the gearing in the said carriage by a splined shaft which permits of the movement of the milling cutter carriage frame in relation to the secondary set of gearing connected to the source of power, the said splined shaft being mounted to be rocked about the end to which power is applied and to be raised and lowered at the opposite end where it is connected to the milling cutter.

8. In a machine of the class described, a frame provided with means for clamping in fixed relation thereto a connecting rod strap, a milling cutter mounted to trim the re-entrant faces of a connecting rod strap, and be driven in its operation from any suitable source of power, a movable carriage for holding the milling cutter along the said frame and vertically in relation to the frame, two sets of screw feeding means for moving the said milling cutter carriage, one set being arranged horizontally and parallel with the main frame members, and the other set adapted to be adjusted at different angles in vertical arrangement to the main frame member.

9. In a machine of the class described, a framework in which the strap is clamped to be operated upon by a milling cutter, a carriage adapted to move in relation to the frame and the strap clamped thereon, a milling cutter carried by said carriage and mounted for trimming the re-entrant faces of said strap, a set of gearing mounted in the carriage for driving the milling cutter, and this gearing connected to a secondary set of gearing and the latter connected to any suitable source of power, engaging and disengaging means in each set of the said gearings for connecting and disconnecting the power for driving the milling cutter, the said set of gearing mounted in the milling cutter carriage connected to the said secondary set of gearing through the medium of a floating horizontally arranged shaft.

10. In a machine of the class described, a framework adapted to hold in fixed position a connecting rod strap, a milling cutter mounted for trimming the re-entrant faces of said strap, a milling cutter carriage mounted to be moved longitudinally along the frame and provided with frame members adapted to be rotated angularly about an axis, which axis extends transversely across the frame; and mechanism for moving the said frame members and the milling cutter carried thereby to and from the said axis, and mechanism for driving the said milling cutter in any position of its normal adjustment.

11. In a machine of the class described, a framework rectangular in outline and provided with means for clamping a connecting rod strap in vertical arrangement above and between the frame members, a carriage for carrying a milling cutter mounted upon the frame and adapted to be fed longitudinally and vertically of the frame whereby the re-entrant faces of said strap may be trimmed, and means for driving the milling cutter as the same may be fed.

12. In a machine of the class described, a framework for holding a connecting rod strap in position to be operated upon by a milling cutter, a milling cutter mounted to move vertically and horizontally in relation to the said strap to trim the re-entrant faces thereof, gearing for moving the said cutter horizontally connected to a source of power and a secondary set of gearing for driving the said milling cutter for actuating the vertical feed thereof connected to the source of driving power by means of a splined shaft carrying bevel gears on each end thereof, and connected to the gearing at each end in a manner that permits an angular movement of the shaft in relation to the driving and the driven ends thereof.

Signed at Chicago, in the county of Cook and State of Illinois, this 20th day of August, 1924.

ARTHUR WILLIAM WALTEMATH.